United States Patent [19]

Wheeler

[11] Patent Number: 4,857,389
[45] Date of Patent: Aug. 15, 1989

[54] COMPOSITION AND METHOD OF MAKING POLYMER SEALS

[75] Inventor: John H. Wheeler, Dallas, Tex.
[73] Assignee: Texacone Company, Mesquite, Tex.
[21] Appl. No.: 148,389
[22] Filed: Jan. 25, 1988
[51] Int. Cl.$^4$ .................................................. B32B 7/02
[52] U.S. Cl. .................................... 428/217; 428/423.3
[58] Field of Search ............................... 428/217, 423.3
[56] References Cited

U.S. PATENT DOCUMENTS

| 4,182,898 | 1/1980 | Fujiwara | 560/26 |
| 4,410,478 | 10/1963 | Lindemayer et al. | 264/248 |
| 4,443,518 | 4/1984 | Martins et al. | 428/336 |
| 4,567,088 | 1/1986 | Skogman et al. | 428/213 |
| 4,731,289 | 3/1988 | Coleman | 428/423.3 |

FOREIGN PATENT DOCUMENTS 234479   6/1959   Australia .......................... 428/316.6

*Primary Examiner*—George F. Lesmes
*Assistant Examiner*—Alisa A. Harbin
*Attorney, Agent, or Firm*—Michael A. O'Neil

[57] ABSTRACT

A polymer seal and method of making same consisting of a combination of pre-polymers cured and bonded together to form a single multi-layered seal of varying hardness with at least one pre-polymer being a polyester-based pre-polymer and at least one pre-polymer being a polyether-based pre-polymer. The different pre-polymers, upon curing, yield 80 to 90 shore A and 80 to 90 shore D hardness urethanes respectively.

5 Claims, 2 Drawing Sheets

COMPOSITION AND METHOD OF MAKING POLYMER SEALS

TECHNICAL FIELD

The present invention relates to polymer seals and more particularly to a composition and method of making polymer seals wherein a combination of pre-polymers are cured and bonded together to form a single, multi-layered polymer seal of variable hardness.

BACKGROUND OF THE INVENTION

In various technical fields, seals of elastic variable hardness material are required, which by reason of their configuration or due to the properties of the material must be assembled from two or more components. This requirement arises in the case of sealing rings for pipe couplings and the like, needing a higher elasticity in one cross sectional zone and a higher degree of shape stability in another cross sectional zone.

In processing such materials, it is desirable to produce moldings from components in which in the first working step the components are manufactured partially consolidated and then in a further working step are connected with one another and hardened.

Composite materials of varying hardness such as the present invention are considerably superior to uniform materials as the harder layer resists hard sharp edges while the softer layer is considerably more resilient and yielding. This provides for a considerable reduction of damage due to crushing and fatigue while at the same time reducing the thickness of the material.

In spite of existing composite materials, there is a need in the marketplace for materials having greater impact resistance, longer working lives, lower weight and other positive properties.

The bonding of reinforced plastics as revealed in the prior art is generally accomplished with reactive multi-component thermal set systems such as peroxide, cured unsaturated polyester, polyol-polyisocyanate systems and epoxy systems. Such systems require precise metering of the components to obtain uniform performance and generally include toxic or sensitive compounds needing special precautions in handling.

Additionally, such systems have a finite open mold time requiring the mating of the bonded parts before the materials cure or advance to a non-bonding stage. Furthermore, such systems require the bonded parts to be held together mechanically for long periods of time until the systems have cured sufficiently to provide a strong bond and consequently require a cleaning or purging of the application equipment to avoid setting of the adhesives and equipment.

Hot melted adhesives such as the present invention overcome such disadvantages since they are single stream systems and are not sensitive to shock. The present invention develops bond strength simply by the passage of short amounts of time and does not require the long curing periods of mechanical fastening. Additionally, they do not present a problem caused by premature cure or set in the application equipment.

The hard crystalline segments in the present invention contribute tensile strength toughness and high temperature performance to the polymer seals. The soft amorphous or low melting segments of the seals contribute wetability, elasticity and rubber characteristics to the seals.

The concept of multi-layered plastic bonding structures is known as is the idea of combining pre-polymers to form a single bonding structure. See e.g. Martins, U.S. Pat. No. 4,443,518; Willett, U.S. Pat. No. 3,933,675; Fujiwara, U.S. Pat. No. 4,182,898; and Lindenmayer, U.S. Pat. No. 4,410,478. Nowhere in the prior art, however, is disclosed the combination of pre-polymers having the characteristics and strengths as found in the present invention. Neither is the method of bonding and forming the polymer seals of the present invention disclosed.

SUMMARY OF THE INVENTION

The present invention comprises a polymer seal Examples 10 of FIG. 1, 20 of FIG. 2 and 30 of FIG. 3)formed from a combination of pre-polymers, cured and bonded together, forming a single multi-layered polymer seal of varying hardness. The harder outer layer 14, 24, and 34 of the seal gives shape stability to the seal and the inner softer layer 12, 22 and 32 forms a malleable elastic connection under normal conditions.

In the preferred embodiment of the invention, at least one pre-polymer consists of a polyester-based pre-polymer and at least one pre-polymer consists of a polyether-based pre-polymer. When cured, these pre-polymers yield an 80 to 90 shore A and 80 to 90 shore D hardness, respectively.

Additionally, the present invention includes a method of making the polymer seals having the above composition wherein the production process steps are: (1) the combination of pre-polymers is degased; (2) the polyester-based pre-polymer is mixed with a curing agent, heated to a pre-determined temperature, and then poured into a preheated mold of a specified shape and design; (3) a pre-determined time interval is allowed to elapse; (4) the polyether-based pre-polymer is mixed with a curing agent, heated to a pre-determined temperature and poured onto the surface of the polyester-based pre-polymer mixture; and (5) the preheated mold is placed into a press for a predetermined length of time for providing the final curing of the seal. It should be noted that the longer the cure time is, the longer the demold time will be.

This methodology will yield a polymer seal having one layer with a shore A hardness of 80 to 90 and a second layer with a shore D hardness of 80 to 90. Thus, a multi-layered polymer seal of varying hardness is formed which incorporates numerous advantages over the prior art. Other methods and variations of this methodology are discussed in more detail in the following Description of the Invention.

BRIEF DESCRIPTION OF THE DRAWINGS

For a more complete understanding of the present invention and the advantage thereof, reference may be made to the following description taken in conjunction with the accompanying drawings in which.

DESCRIPTION OF THE INVENTION

Figure 2:
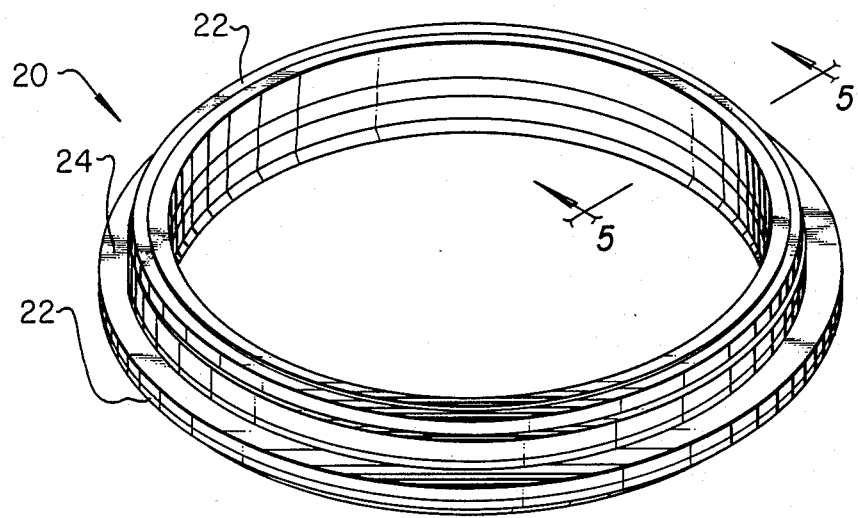
FIG. 2 is a perspective view of one example of the polymer seal made from a method described in Example 2.
Figure 1:
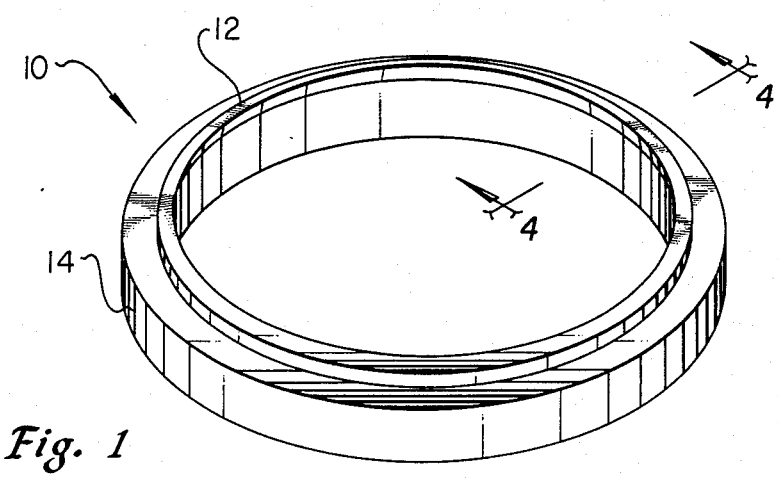
FIG. 1 is a perspective view of one example of the polymer seal made from a method described in Example 1.
Figure 3:
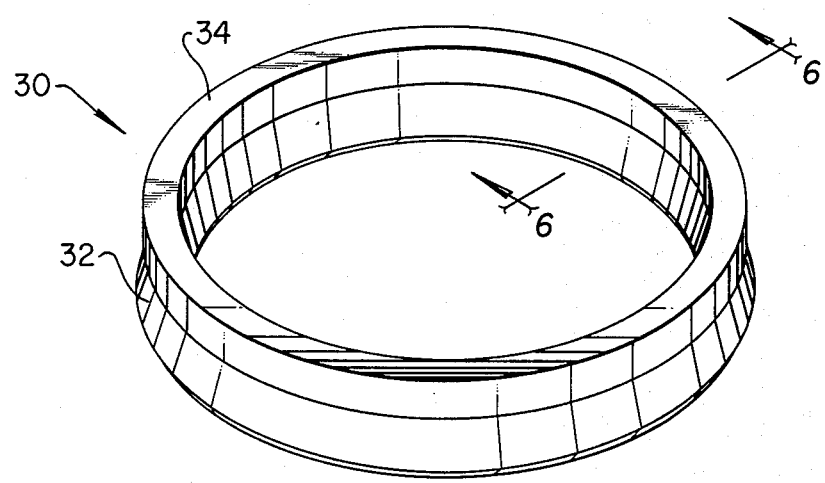
FIG. 3 is a perspective view of one example of the polymer seal made from a method described in Example 3.

In general, the present invention consists of a polymer seal examples of which are illustrated as 10 of FIG. 1, 20 of FIG. 2 and 30 of FIG. 3 comprising a combination of pre-polymers cured and bonded together to form a single multi-layered seal of varying hardness with at least one pre-polymer being a polyester-based pre-polymer 12, 22 and 32 and at least one pre-polymer being a polyether-based pre-polymer 14, 24 and 34. The different pre-polymers upon curing yield 80 to 90 shore A and 80 to 90 shore D hardness urethanes, respectively.

EXAMPLE 1

Figure 4:
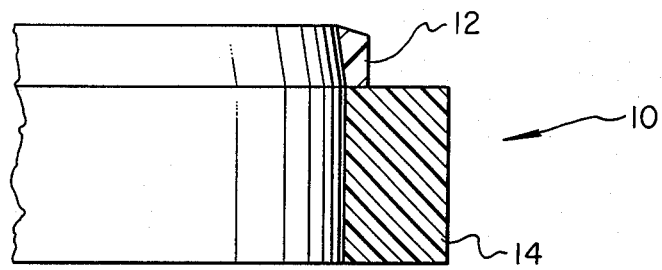
FIG. 4 is a cross-section view of FIG. 1.

In one embodiment of the present invention the polymer seal 10 of FIGS. 1 and 4 consists of a combination of two pre-polymers, an 8090 and an L-275, both of which are commercially available from various suppliers. The 8090 is a polyester-based pre-polymer yielding a 90 shore A hardness urethane layer 12 when cured. The L-275 is a Polyether-based pre-polymer yielding a 90 shore D hardness urethane layer 14 when cured.

Curing is effected using conventional curing agents, such as 4, 4'-methylene-bis (orthochloroaniline), commercially available under the trademarks Curene ®442 (Anderson Dev. Co.) and Moca,®(Dupont). Other standard curing agents such as 1, 4-butane diol, trimethylolpropane, neopentylglycol, and methylene dianiline can also be used to effect curing. Thus, any curing agent including those Presently known, can be used with the pre-polymers of the present invention. With regard to the quantity of curing agents, once again standard practice may be used, for example, a standard stoichiometry of 95% may be utilized.

Although any of the above curing agents may be used with the present invention, it should be noted that in the preferred embodiment of the invention 4, 4'-methylene-bis (orthochloroaniline) is used.

The recommended production procedures are as follows: (1) both pre-polymers are degased; (2) the pre-polymer 8090 is mixed with the 4, 4'-methylene-bis (orthochloroaniline) and poured at a temperature of between 175° F. to 180° F. into a preheated mold of predetermined shape; (3) a time interval of three and one half (3½) minutes is allowed to elapse before the addition of the pre-polymer L-275 mixture in order to form a bond and not a mixture between the two pre-polymer mixtures; (4) the pre-polymer L-275 is mixed with the 4, 4'-methylene-bis (orthochloroaniline) and poured at a temperature of 150° F. onto the surface of the 8090 mixture to form layer 14; and (5) the preheated mold is placed in a press for final curing. Note that the longer the cure time is, the longer the demold time will be.

EXAMPLE 2

Figure 5:
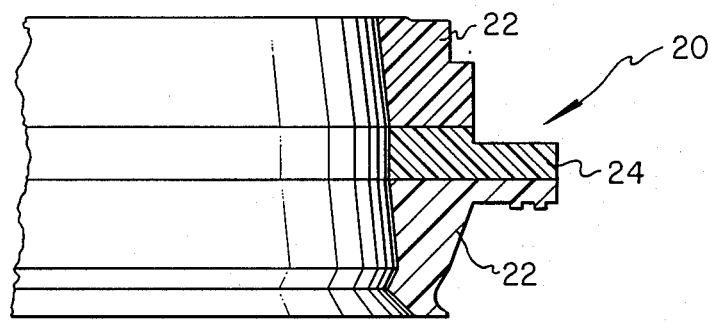
FIG. 5 is a cross-section view of FIG. 2.

In Example 2 the polymer seal 20 of FIGS. 2 and 5 consists of a combination of the pre-polymers 8080 and L-275, both of which are commercially available. The 8080 is a polyester-based pre-polymer that yields an 80 shore A hardness urethane first and second layers 22 when cured with 4, 4'-methylene-bis (orthochloroaniline). The L-275 is a polyether-based prepolymer yielding an 80 shore D hardness urethene when cured with 4, 4'-methylene-bis (orthochloroaniline).

The preferred production procedures are as follows: (1) both pre-polymers are degased; (2) the pre-polymer 8080 is mixed with the curing agent and poured at a temperature of between 175° F. to 180° F. into a preheated mold of a predetermined shape to for first layer 22; (3) a time interval of three and one half (3½) minutes is allowed to elapse between the pouring of the pre-polymer 8080 mixture and the pouring of the pre-Polymer L-275 mixture in order to form a bond between the pre-polymers; (4) the pre-polymer L-275 is mixed with the curing agent and poured at a temperature of 150° F. onto the surface of the 8080 mixture to form layer 24; (5) a time interval of two and one half (2½) minutes is allowed to elapse between the addition of the pre-polymer L-275 mixture to the pre-polymer 8080 mixture so as to form a bond and not a mixture; (6) the pre-polymer 8080 is mixed with a curing agent and poured at a temperature of between 175° F. and 180° F. onto the surface of the L-275 mixture to form second layer 22. This procedure forms the lip of the seal; and (7) the preheated mold is placed in a press for final curing, noting once again that the longer it is cured, the longer the demold time will be.

EXAMPLE 3

Figure 6:
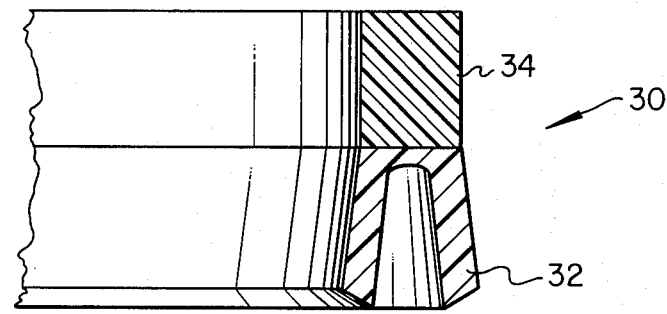
FIG. 6 is a cross-section view of FIG. 3.

In Example 3 the polymer seal 30 of FIGS. 3 and 6 uses a combination of two pre-polymers, 8080 and L-275. The 8080 is a polyester-based pre-polymer yielding an 80 shore A hardness urethane when cured with 4, 4'-methylene-bis (orthochloroaniline) or other suitable curing agent. The L-275 is a polyether-based pre-polymer yielding an 80 shore D hardness urethane layer 34 when cured with 4, 4'-methylene-bis (orthochloroaniline) or other suitable curing agent.

After degasing both pre-polymers, the recommended production procedures are as follows: (1) the pre-polymer 8080 is mixed with 4, 4'-methylene-bis (orthochloroaniline) and poured at a temperature of between 175° F. to 180° F. into a preheated mold of predetermined shape to form layer 32; (2) a time interval of three and one half (3½) minutes is allowed to elapse before the pre-polymer L-275 mixture is poured onto the pre-polymer 8080 mixture in order to form a bond and not a mixture; (3) the pre-polymer L-275 is mixed with 4, 4'-methylene-bis (orthochloraniline) and poured at a temperature of 150° F. onto the surface of the 8080 mixture to form layer 34; and (4) the preheated mold is placed in a press for final curing, noting once again that the longer the cure time, the longer the demold time.

It will be apparent to those skilled in tee art that various changes may be made without departing from the scope of the invention, and the invention is not to be considered limited to what is described in this specification.

I claim:

1. A polymer seal comprising:
   a first pre-polymer being a polyether-based pre-polymer yielding on curing an 80–90 shore A hardness urethane; and
   a second pre-polymer being a polyether-based pre-polymer yielding on curing an 80–90 shore D hardness urethane said first and second pre-polymers being cured and bonded together to form a single multi-layer seal having a first layer to give shape stability to the seal and a second relatively softer layer to give malleable elasticity to the seal.

2. A polymer seal in accordance with claim 1 wherein the curing agent is a 4, 4'-methylene-bis (orthochoroaniline).

3. A polymer seal comprising:
a polyester-based pre-polymer yielding on curing an 80-90 shore A hardness urethane; and
a polyether-based pre-polymer cured and bonded to said polyester-based pre-polymer and yielding an 80 to 90 shore D hardness urethane, said cured and bonded pre-polymers forming a single multi-layered polymer seal that has a first layer to give shape stability to the seal and a second relatively softer layer to give malleable elasticity to the seal.

4. A seal as in claim 1 wherein said first and second pre-polymers are cured and bonded together in a single mold.

5. A polymer seal comprising:
a first outer layer formed of a pre-polymer being a polyester-based pre-polymer;
an inner layer formed of a pre-polymer yielding on curing an 80-90 shore A hardness urethane being a polyether-based pre-polymer yielding on curing an 80-90 shore D hardness urethane ;and
a second outer layer formed of a pre-polymer being a polyester-based pre-polymer yielding on curing an 80-90 shore A hardness urethane, said first, inner and second layer being cured and bonded together to form a single, multi-layered seal, said inner layer being relatively hard to give shape stability to the seal and said first and second outer layers being relatively soft to give malleable elasticity to the seal.

* * * * *

UNITED STATES PATENT AND TRADEMARK OFFICE
CERTIFICATE OF CORRECTION

PATENT NO. : 4,857,389
DATED : Aug. 15, 1989
INVENTOR(S) : John H. Wheeler

It is certified that error appears in the above-identified patent and that said Letters Patent is hereby corrected as shown below:

Column 1, line 64, "tensile" should be --tensil--.

Column 2, line 14, "seal Examples" should be -- seal (Examples--.

Column 3, line 47, "shape; (3)" should be --shape to form layer 12; (3)--.

Column 4, line 5, "to for first" should be --to form first--.

Column 4, line 29, "urethane when" should be --urethane layer 32 when--.

Column 4, line 50, "tee" should be --the--.

Column 4, line 64, "multi-layer" should be --multi-layered--.

Column 6, line 2, "pre-polymer;" should be --pre-polymer yielding on curing an 80-90 shore A hardness urethane;--.

Column 6, line 3, "pre-polymer yielding on curing an 80-90 shore A hardness urethane being" should be --pre-polymer being--.

Signed and Sealed this

Third Day of April, 1990

*Attest:*

HARRY F. MANBECK, JR.

*Attesting Officer*   *Commissioner of Patents and Trademarks*